United States Patent
Witten et al.

(10) Patent No.: US 11,303,529 B1
(45) Date of Patent: Apr. 12, 2022

(54) EFFICIENT NETWORK TOPOLOGY DIAGNOSTIC

(71) Applicant: Cox Communications, Inc., Atlanta, GA (US)

(72) Inventors: Todd Witten, Atlanta, GA (US); Joshua Watkins, Atlanta, GA (US); Eric Hansen, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/112,818

(22) Filed: Dec. 4, 2020

(51) Int. Cl.
*H04B 10/27* (2013.01)
*H04L 41/12* (2022.01)

(52) U.S. Cl.
CPC ............. *H04L 41/12* (2013.01); *H04B 10/27* (2013.01)

(58) Field of Classification Search
CPC ......... H04B 10/27; H04L 41/12; H04L 12/28; H04L 9/3242
See application file for complete search history.

(56) References Cited

U.S. PATENT DOCUMENTS

| | | | | |
|---|---|---|---|---|
| 2005/0131900 A1* | 6/2005 | Palliyll | ............... | H04L 67/2819 |
| 2005/0237948 A1* | 10/2005 | Wan | ......... | H04L 61/35 370/254 |
| 2013/0205013 A1* | 8/2013 | Krco | ....................... | H04L 41/12 709/224 |
| 2019/0132133 A1* | 5/2019 | Druker | .................... | H04L 63/12 |
| 2020/0107035 A1* | 4/2020 | Li | ........................... | H04N 19/44 |
| 2020/0210407 A1* | 7/2020 | Yang | ..................... | H04L 9/3265 |

* cited by examiner

*Primary Examiner* — Dzung D Tran
(74) *Attorney, Agent, or Firm* — Eversheds Sutherland (US) LLP

(57) ABSTRACT

This disclosure describes systems, methods, and devices related to efficient network topology diagnostic. A device may scan a network topology associated with a fiber-optic network infrastructure. The device may discover one or more components of the network topology. The device may capture information associated with the one or more components. The device may generate a first hash value based on the information associated with the one or more components. The device may access a topology database comprising a second hash value associated with the one or more components. The device may compare the first hash value to the second hash value. The device may perform an action on the topology database based on the comparison.

20 Claims, 8 Drawing Sheets

EFFICIENT NETWORK TOPOLOGY DIAGNOSTIC

TECHNICAL FIELD

This disclosure generally relates to systems and methods for fiber-optic communications and, more particularly, to efficient network topology diagnostic.

BACKGROUND

In a fiber-optic network infrastructure of an enterprise, various nodes may be interconnected to form a topology. There may be many topologies included in a network infrastructure that may cover a larger geographic map that could span over multiple cities and states. Although management tools may be present on some devices, these management tools do not provide a status on the health of these ring topologies beyond the physical configuration of the connected nodes. Therefore, there is a need for an enhanced mechanism that can efficiently discover a topology and be able to use that topology data to associate the physical links and network nodes to the logical construct of purposes of event correlation.

DETAILED DESCRIPTION

Figure 1:
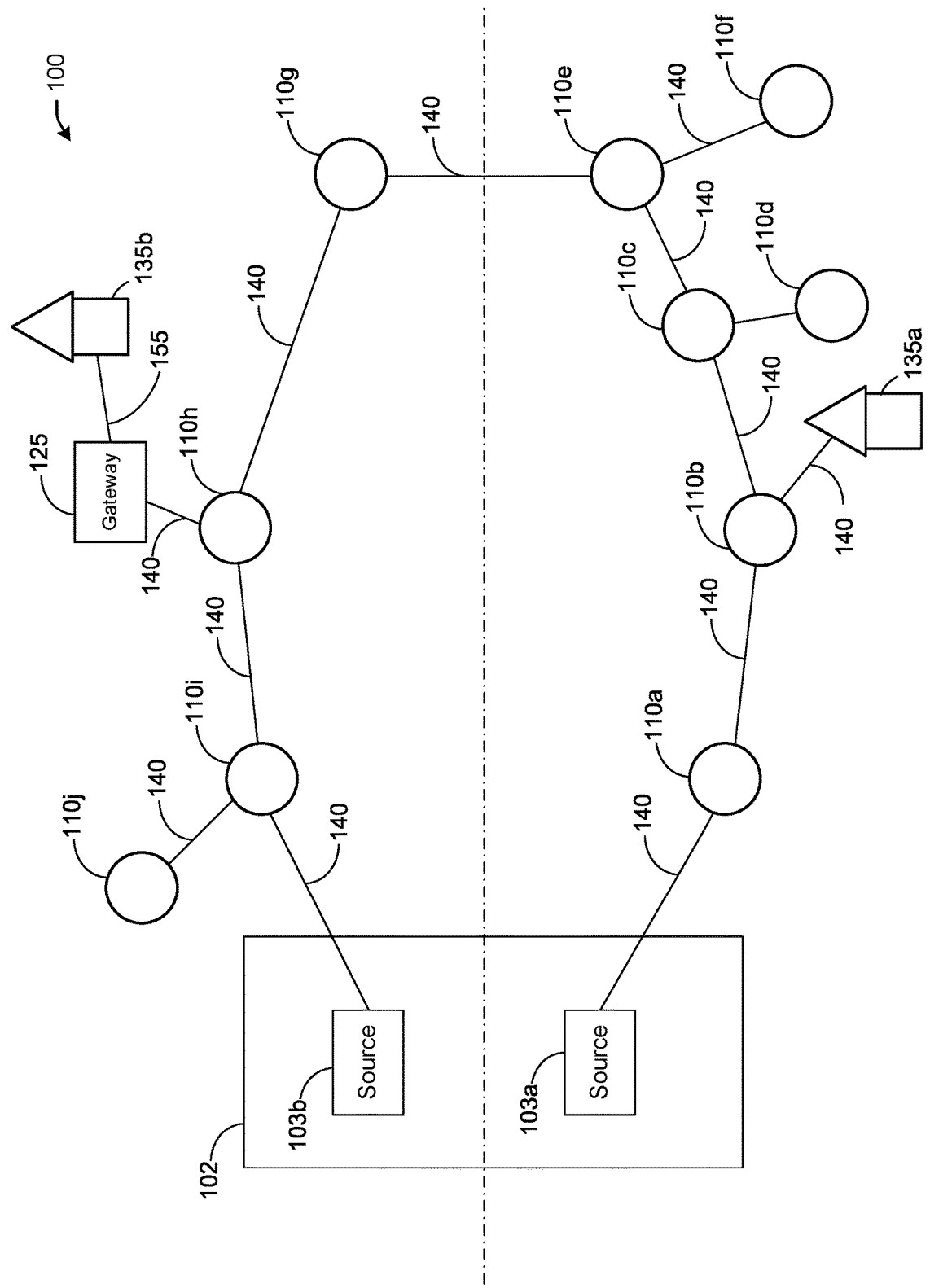
FIG. 1 illustrates a block diagram of an example system for providing an efficient network topology diagnostic, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

In a fiber-optic network infrastructure of an enterprise, various nodes may be interconnected to form a topology.

Typically, nodes in a fiber-optic network communicate using a communication standard, such as multiprotocol label switching (MPLS). Although management tools may reside on some devices giving a graphical overlay of nodes that are present in a fiber-optic network, these management tools do not provide a status on the health of these ring topologies beyond the physical configuration of the connected nodes. For example, if there is a physical failure between nodes in the field, the management tools may show such a failure. However, in case of a logical failure, such as having an MPLS failure but not a physical failure, these management tools would not show such failure. Therefore, there is a need to develop a mechanism to monitor the health of a fiber-optic network not only on the physical ports but also on the logical services level.

Example embodiments of the present disclosure relate to systems, methods, and devices for efficient network topology diagnostic.

In an enterprise providing fiber-optic network infrastructure, there may be a central location, referred to as a data center. The data center may comprise at least two core routers that provide redundancy for the data center. A customer device that may be in the field may be a router that is connected to a fiber-optic ring of the fiber-optic network infrastructure. The router may have a connection back to the data center. In that setup, the router may have two links to and from the two core routers. If a second customer device is to be added to the fiber-optic ring, a physically/geographically closest customer device may be located in order to tie in the second customer device to the fiber-optic ring. Therefore, there will be a starting connection at the data center on the first core router out to customer A, from customer A to customer B, and from customer B back to the second core router at the data center, which would form a ring. In case a third customer device is to be added, then the first core router will connect to customer A, then customer A to customer B, customer B to customer C, and then back to the data center at the second core router. In case a link between customer A and customer B is broken, customer A would still be connected to the first core router and customer B will still be connected to customer C, which is in turn connected to the second core router. Hence this ring topology forms a redundancy feature in the network infrastructure.

Existing management tools are typically element discovery tools or element managers. These management tools discover connected devices and understand their interfaces, such that each interface has a given status. However, these management tools are not a network discovery tool where nodes in the network appear in a logical order that forms a ring based on device to device and hop to hop connections, where a ring is a series of links. These management tools do not show nodes, elements, or devices that are on a specific ring in a specific market/region. Therefore it is difficult to understand from a market/region perspective the hierarchy of where rings are and what their content is. It is beneficial to be able to determine the status of the nodes that exist in a specific ring efficiently. Also, it is beneficial to be able to utilize a topology database that comprises aspects of a plurality of nodes in a plurality of rings. For example, if some alarms are detected, it would be beneficial to determine which ring resulted in these alarms to correlate that to an event or an incident. Existing management tools do not provide such granularity of network health.

In one or more embodiments, an efficient network topology diagnostic system may utilize a poller process to automatically discover a ring, name it accordingly, and create an association of the ring to the network topology. In one or more embodiments, a poller process may reside on a computer associated with a data center of a fiber-optic network. The data center may be responsible for the automation of various aspects of the network including for example notifications, business practices, changes to the routers. In such a network, there may be a large number of nodes (e.g., routers), for example, in the order of thousands. In addition, many other nodes may be added or removed from the network. Such a dynamic environment requires an efficient way to automatically discover additions of nodes, removals of nodes, or any other topology changes. For example, such changes may affect the various rings in the network resulting in changes to the details of these rings. An efficient network topology diagnostic system may facilitate the automatic discovery of the rings and the nodes that make up one or more topologies in a fiber-optic network.

In one or more embodiments, an efficient network topology diagnostic system may run a poller process at a predetermined interval (e.g., every 10 minutes) to discover the network at that predetermined interval. The efficient network topology diagnostic system may have network connectivity to all regions of the enterprise spanning over various cities and states. The efficient network topology diagnostic system may reach out and communicate with those networks across the enterprise backbone. The poller process may initiate discovery of the network at the predetermined interval to rediscover the network. The poller process may provide a fast mechanism to determine whether changes have occurred in a particular region of the network. In case no changes have occurred in that particular region, the poller process may continue the discovery of the rest of the regions without traversing through all the details of each of the nodes in case nothing changed. The poller process may utilize an efficient mechanism that assigns a singular hash value that correlates various aspects of a component of the network (e.g., a ring, a node, a link, etc.) into the hash value. This hash value may then be compared to a topology database that comprises various hash values associated with various components of the fiber-optic network infrastructure of the enterprise. Without the poller process, determining whether something has changed in a network may take a long time to process. For example, if a Southeast region has not experienced any changes, currently, in order to analyze that region, a discovery process may need to traverse through all the components of that Southeast region even though nothing has changed. A discovery process may start by accessing a device and determining what is directly connected to that device. The discovery process may then continue to branch out to additional devices to discover the topology. This process may take a long time because of the traversing from device to device even if nothing has changed in that topology. However, the poller process may quickly determine that no changes have occurred in that Southeast region and therefore the poller process continues to the next region without spending too much time traversing through various components of a topology.

In one or more embodiments, an efficient network topology diagnostic system may capture various information associated with the components of topology and produce a hash value using a hashing mechanism (e.g., SHA-1 algorithm, MD5 algorithm, or any other hashing mechanism). This hash value may then be used to update the topology database when the hash value does not match a prior hash value in the database from a prior run of the poller process.

In one or more embodiments, an efficient network topology diagnostic system may facilitate that a topology database may be built based on running the poller process at the predetermined interval (e.g., every 10 minutes). The information in the topology database may be associated with the working and non-working components of a network. For example, the topology database may comprise information associated with a ring but that information does not have to start out with the ring being in a working state. In that case, a ring may not be whole, have broken links, or a node in the ring may have been designed to be a spoke instead of a ring.

In one or more embodiments, there may be devices that are hanging off of rings, at customer sites, such that these devices may belong to the ring but do not form a redundant path back to the data center. Even at some sites, there may be a mini-hub which may be a router that may be for 5 to 10 customers or even fewer customers worth of fiber drops. These types of connections are considered spokes. A spoke may represent a point where a piece of equipment hangs off a ring. It should be appreciated that such configuration is not limited to one device hanging off a ring but there may be many scenarios where there could be a plurality of devices that may be connected to a ring but do not form a ring or do not have a redundancy path to the data center as in the case for a ring. It should also be appreciated that the number of rings and a network may be in the order of thousands and that at any given time there may be a percentage of these rings there are broken due to events that occur in the network. For example, in certain scenarios, schools may shut down and power off their equipment resulting in rings that may be broken because of that. Therefore, at any given time a percentage of nodes may be unreachable due to power and environmental conditions and events causing rings to be impaired.

In one or more embodiments, an efficient network topology diagnostic system may facilitate the discovery of topology at a predetermined interval by capturing the nodes in the clockwise path direction and the counterclockwise path direction to and from the data center. For example, there may be two completely separate yet related singular legs based on the description of each leg, where the ports are similar to each other are. The efficient network topology diagnostic system may determine that the two single legs may belong to the same ring. This way, if and when that ring becomes whole again, the poller process may logically create and put the ring back together in the database by storing it as a single construct.

In one or more embodiments, an efficient network topology diagnostic system may facilitate the use of a topology database that may be accessed by the poller process. A topology database that comprises aspects of a plurality of nodes in a plurality of rings. A topology database that comprises various hash values associated with various components of the fiber-optic network infrastructure of the enterprise. The information in the topology database may be associated with the working and non-working components of a network. When the poller process is not running, the database is a snapshot of what the result of that poller process prior run was. This database does not maintain a long-term of historical information. At a minimum, the database maintains information associated a last time something changed in topology. A status of a ring may be "working," "simplex," or "other." The status of "other" means that a ring had some nodes that were attached as spokes but at least some of these spokes are no longer present. But the ring integrity is still whole such that a redundant path still exists to and from the two network cores at the data center. In other words, the status of "other" means that something has changed in this ring, or one of the ring nodes is down, or one of the links on the ring is down, but that change did not affect the integrity of the ring. When the ring read "simplex," this means that there is only one path back to the network core at the data center. It should be understood that the three statuses listed above are only examples that depend on the implementation and are not meant to be limiting. Other statuses may be used to reflect the state of components in the network.

The database may comprise the last time the status of a ring changed. For example, at one time-stamped, the ring may be in "simplex" or "other" as opposed to a working state however that status may have been determined some hours prior, when the last change occurred. The poller process merely operates on the database and stores its results of the run in that database. Users in the field will have visibility by constantly watching their region from a network operating center (NOC) or a local operations center so that status reflected in the database is visible to the users to take appropriate action. Any rings that are impacted may be shown to the user via an application programming interface (API) or any other means. This way, this information is refreshed based on the poller process running interval (e.g., every 10 minutes). The user interface uses these APIs to display the data on a screen. And if there is a new ring found to be in simplex, the users may open a ticket to address the issue. This data may be consumed directly from the database via the APIs. Tickets may be opened based on that data for anything that is now known to be in simplex that was not previously. In addition to that, there may be a daily email that goes out every morning that lists all the rings that are in simplex for that region. This may be useful because there are maintenance windows during the night where the ring may be brought off-line intentionally in order to add new network devices. When these reports come out, they show the status of that region from a ring health perspective, because of all these overnight activities. In addition, technicians working on the network may use the poller process as a certification tool to determine whether they caused an impairment when they perform maintenance on a ring for example. The management tools on the nodes may show a physical condition of a node or a link but if something is broken with MPLS for example these management tools would not be able to detect that. These management tools would not flag that something is wrong with the ring even though there is an impairment on that ring. MPLS is a routing technique in telecommunications networks that directs data from one node to the next based on short path labels rather than long network addresses, thus avoiding complex lookups in a routing table and speeding traffic flows. MPLS can encapsulate packets of various network protocols. MPLS supports a range of access technologies, including T1/E1, asynchronous transfer mode (ATM), Frame Relay, and digital subscriber line (DSL).

Existing management tools may know the status of the physical port and one layer of the network but would be incapable of detecting a fault in the various routing protocols that are all interrelated. However, the efficient network topology diagnostic system may flag logical problems at any of the protocols running in a ring, which are not obvious to the existing management tools. Some protocols like resource reservation protocol (RSVP), integrated intermediate system-to-intermediate system (IS-IS) IS-IS, open shortest path first (OSPF), link layer discovery protocol (LLDP), or any other communication protocol. The efficient network topology diagnostic system may render the time to fix issues with such protocols much faster because a poller process may flag changes to a technician at a predetermined interval.

In one or more embodiments, an efficient network topology diagnostic system may determine a fault in a topology of a network based on building, updating, and comparing various hash values that represent components of the topology. Some examples of hashing algorithms/mechanisms that may be used include secure hash algorithm 1 (SHA-1 algorithm), MD5 hashing algorithm, or other algorithms. SHA-1 is a cryptographic hash function which takes an input and produces a 160-bit (20-byte) hash value known as a message digest typically rendered as a hexadecimal number, 40 characters long. An MD5 algorithm is a widely used hash function producing a 128-bit hash value. The efficient network topology diagnostic system may generate a few hashes to represent the various components of the topology. For example, each ring in the database may store a hash of the links associated with the ring. These links may be all the connections in the ring. For example the connection from a first core router in the data center to node A, then node A to node B, then node B to C, then node C to the second core router at the data center. Another hash may be stored that is reflective of all the routers that are in a particular ring. The information that is being hashed may comprise, for example, the name of the router, the firmware, its model, and other router information. This way in case a technician swapped out a router with a different model, the hash value will reflect a change and trigger an update to the database. Another hash may represent the ring ID as a whole. As was stated, the core routers in the data center have starting links out to the field, where those links get a hash value (e.g., SHA-1 hash, MD5 hash, or using any other hashing algorithm). For example, a 40 character SHA-1 hash may be assigned to starting links and the return link back to the data center may also be assigned a 40 character SHA-1 hash. Appending these two strings would result in an 80 character ID representing the two paths forming the ring. This way, when the poller process runs and results in a 40 character ring ID this indicates that the ring is impaired because the 40 character ring ID identifies only a portion of a ring. This may also indicate that this ring ID represents a ring that was never together to begin with or both could have been a spoke. If the poller process returns an 80 character ring ID, this means that there are a start and an end links back to the data center meaning that this is a full ring. In another example, if the poller process returns 120 character ring ID, then there exists a ring with additional connections brought back to the core via another spoke that somehow was hanging off but turned back into a subring attached to the ring. The ring links hash comprises information about each link between two boxes/nodes, some of these may comprise: source OSPF state, destination OSPF state, source RSVP state, destination RSVP state, source loopback IPv4 address, destination loopback IPv4 address, source point-to-point IPv4 address, destination point-to-point IPv4 address, source interface name, destination interface name, source port description, destination port description, source port number, source physical state change count. This way, any changes to that information captured in a ring links hash may indicate a change that will be flagged. Additionally, if anything changes between two boxes/nodes, or an interface gets renamed, that also triggers a change in the database. The router hash may comprise the router name, its model number, its loopback IP address, node firmware version, node health status, node hostname. For example, if a technician swaps out a node that would cause two hashes to change: the ring links hash and the router hash. A ring hash may be used to identify or "fingerprint" a ring. Concatenation of all SHA1 hashes from the core links in each ring (multiple of 40 characters long.

Each core link is a SHA1 hash of the below information: Core Router Loopback IPv4 Address, Core Router Interface Name, Core Router Neighbor Point-to-point IPv4 Address, and Core Router Neighbor Loopback IPv4 Address.

In one or more embodiments, an efficient network topology diagnostic system may be independent of the routing protocol when capturing, comparing, and updating a topology database. Each protocol may have its own status indicator. For example, IS-IS might have an in-service or out-of-service indicator but OSPF might have a status of two-way on a link or a transition status. In a fiber-optic network, there may OSPF rings and IS-IS rings. Therefore, when the poller process generates the hash string reflecting information for a particular device, that hash string is independent of the type of ring or protocol running on that device. As long as the statuses of rings, routers, links, stay the same, their hash values do not change indicating that these components are not experiencing impairments.

In one or more embodiments, there may be many scenarios that result in an update to the topology database. For example, after the poller process has been completed, a ring may have started as a simplex ring, which the efficient network topology diagnostic system does not know if it is supposed to be a ring. The efficient network topology diagnostic system may determine the existence of two spokes that have incomplete ends on them. Hence, the poller process may represent these two legs as two 40 character ring IDs in the database. In case this was originally a full ring but for some reason, it was changed to simplex due to an impairment and if that impairment is later fixed, the poller process may scan and find an 80 character ring ID. The efficient network topology diagnostic system may perform a check in the database on two halves of the 80 character ring ID (e.g., two 40 character ring IDs representing two portions of a ring) to determine if any of these halves exist in the database. The efficient network topology diagnostic system may break the full 80 character ring ID into a first 40 character ring ID and a second 40 character ring ID. If one of these 40 character ring IDs is present in the database, this indicates that a ring was impaired because it was shown as half of the newly discovered 80 character ring ID. The efficient network topology diagnostic system may further search for the second 40 character ring ID in the database. If the second 40 character ring ID is found in the database, this indicates that there were two partial rings. The efficient network topology diagnostic system may remove anything associated with those partial rings, remove their links, ring entries, and devices, and then write in everything from the newly discovered complete ring. Therefore, this becomes a new ring at that point. But in the opposite case, if the database started with a full ring, and now that ring is under impairment, the scan would result in only a portion of the 80 character ring ID (e.g., 40 character ring ID). The efficient network topology diagnostic system may then flag that the originally captured ring is now impaired. Further, the efficient network topology diagnostic system may determine based on a comparison of the newly discovered complete ring 80 character ring ID with the database that one or more devices may be in an offline state.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of efficient network topology diagnostic, according to some example embodiments of the present disclosure.

A first example system 100 or infrastructure for providing fiber-optic communication will now be described. The system 100 may include a data center 102 comprising two core routers (sources 103a and 103b), one or more fiber-optic nodes 110 (110a-110j) one or more gateway devices 125, and one or more households 135a and 135b. The sources 103a and 103b may be configured to output fiber-optic broadband communications for delivery to the fiber-optic nodes 110 in the network. According to an aspect of the disclosure, signals or communications that are output by fiber-optic node 110 may be communicated to the sources 103a and 130b using at least one of two separate return paths.

With reference to FIG. 1, the sources 103a and 103b may be suitable sources of fiber-optic broadband content. The sources 103a and 103b may be configured to generate and/or combine any number of data streams and/or data components into a fiber-optic broadband signal for receipt by the one or more fiber-optic nodes 110.

In one or more embodiments, a generated broadband signal may be output utilizing one or more fiber-optic cables 140 or optical fibers that are configured to carry the broadband signal from the sources 103a and 103b to one or more corresponding fiber-optic nodes. For example, the radio frequency broadband signal may be processed utilizing one or more suitable wavelength-division multiplexing ("WDM") devices or WDM systems (not shown here), and the processed signal may be provided to or driven onto the optical fiber 140. A wide variety of different types of WDM devices may be utilized as desired in various embodiments of the disclosure, such as dense WDM devices and add-drop WDM devices. As desired, a WDM device may include a terminal multiplexer component that includes one or more wavelength-converting transponders. Each wavelength-converting transponder may receive one or more components of the input broadband signal and convert that signal into a light signal using a suitable laser, such as a 1550 nm band laser. The WDM device may amplify the broadband signals that are processed by the WDM device. Additionally, one or more line repeaters or other amplifying devices may be positioned along a length of the optical fiber 140 to amplify the broadband signal and compensate for any losses in optical power.

The optical fibers 140 may be configured to carry broadband signals between the sources 103a and 103b and the one or more fiber nodes, between each of the one or more fiber-optic nodes 110, and between the one or more fiber-optic nodes and the households 135a and the one or more gateway devices 125. For example, the optical fibers 140 may carry signals between the sources 103a and 103b and the fiber nodes 110. A wide variety of optical fibers 140 may be utilized as desired in various embodiments of the disclosure, such as multi-mode fibers, single-mode fibers, and special-purpose fibers. Additionally, the optical fibers 140 may be constructed from a wide variety of different materials, such as silica, fluorides, phosphates, and/or chalcogenides. The optical fibers 140 may be configured to carry signals as light pulses utilizing total internal reflection.

With continued reference to FIG. 1, any number of fiber nodes may be provided. Each fiber-optic nodes 110 may be configured to receive and process downstream or forward-path signals from the sources 103a and 103b. In certain embodiments, the fiber-optic nodes 110 may be configured to amplify forward path and/or return path signals. For example, the fiber-optic nodes 110 may include respective amplifiers or amplification components that are configured to amplify or enhance the forward signal, a relatively low-frequency return path signal, and a relatively high-frequency return path signal.

Each cable line 155 may be configured to communicate broadband signals or broadband communications between one or more gateway devices 125 and the household 135b connected using the cable line 155. A cable line 155 may be configured to communicate both forward path and return path broadband signals. A wide variety of suitable cable lines may be utilized as desired in various embodiments of the disclosure. For example, various types of coaxial cables and/or other RF cables may be utilized.

With continued reference to FIG. 1, a suitable gateway device may be configured to provide broadband services to a household. In certain embodiments of the disclosure, a home gateway device 125 may be provided for a household 135b FIG. 2 depicts an illustrative schematic diagram for efficient network topology diagnostic, in accordance with one or more example embodiments of the present disclosure.

Figure 2:
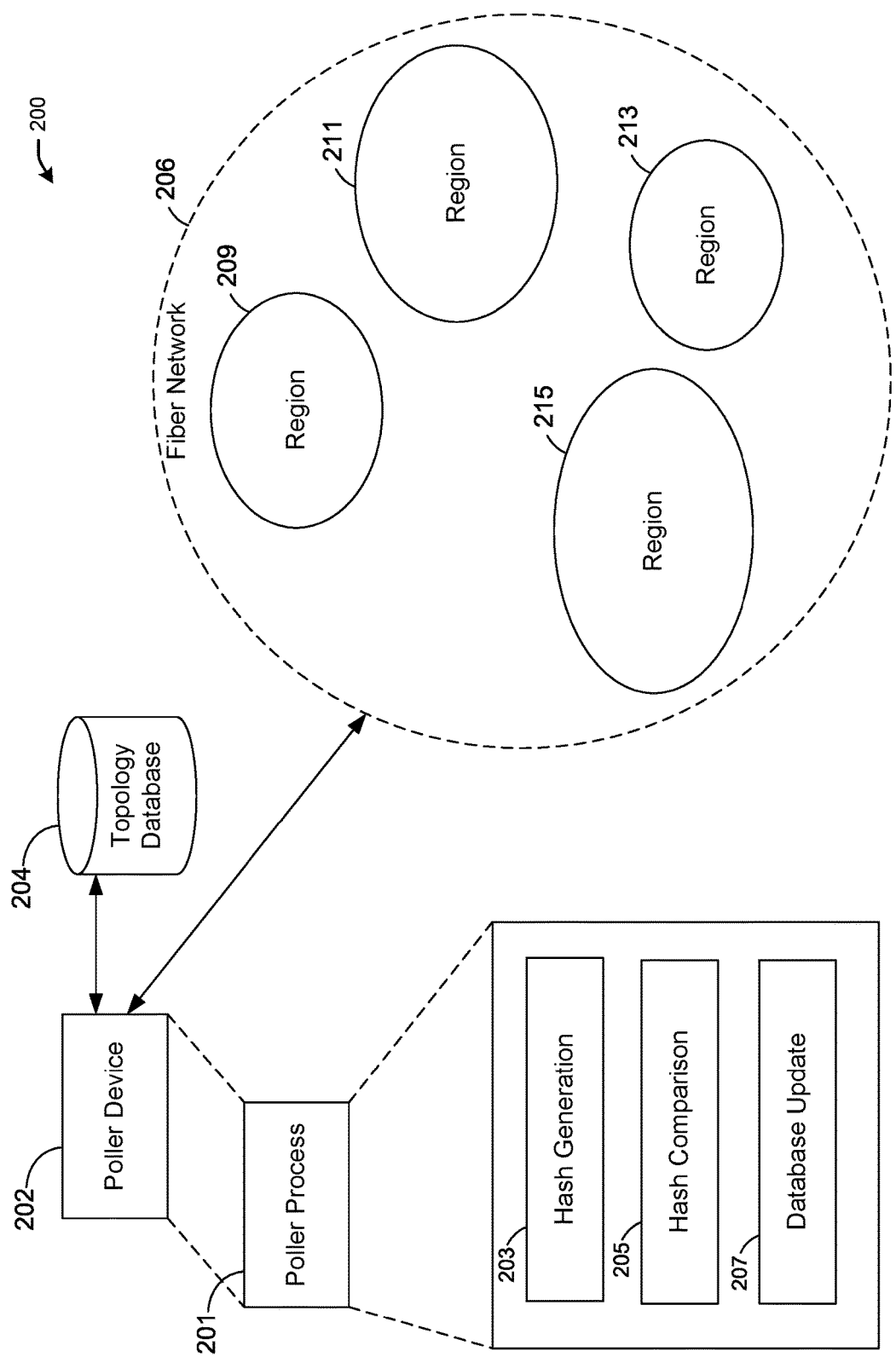
FIG. 2 depicts an illustrative schematic diagram for a network, in accordance with one or more example embodiments of the present disclosure.

Referring to FIG. 2, there is shown an illustrative efficient network topology diagnostic system that comprises a poller device 202, a topology database 204, and a fiber-optic network 206. The fiber-optic network 206 may cover a number of regions (e.g., regions 209, 211, 213, and 215) that span over a large geographical area (e.g., cities and states). A poller process 201 may reside on the poller device 202. The poller process 201 may perform one or more functions comprising hash generation 203, hash comparison 205, and database update 207. The poller device 202 may access the topology database 204 to retrieve data, compare data, and update data with the topology database 204 based on running the poller process 201.

In one or more embodiments, an efficient network topology diagnostic system may utilize a poller process to automatically discover components in a topology. For example, in discovering a ring, the poller process may name the ring accordingly, and create an association of the ring to the networked topology. In one or more embodiments, a poller process may reside on the poller device 202. Some changes may occur on the fiber-optic network 206 including for example notifications, business practices, changes to the routers. In such fiber-optic network 206, there may be a large number of nodes (e.g., routers), for example, in the order of thousands. In addition, many other nodes may be added or removed from the fiber-optic network 206. Such a dynamic environment requires an efficient way to automatically discover additions of nodes, removals of nodes, impairment of nodes, or any other topology changes. For example, such changes may affect the various rings in the fiber-optic network 206 resulting in changes to the details of these rings. An efficient network topology diagnostic system may facilitate the automatic discovery of the rings and the nodes that make up one or more topologies in the fiber-optic network 206.

In one or more embodiments, an efficient network topology diagnostic system may run the poller process at a predetermined interval (e.g., every 10 minutes) in order to discover the fiber-optic network 206 at that predetermined interval. The efficient network topology diagnostic system may have network connectivity to all regions of the enterprise spanning over various cities and states. The efficient network topology diagnostic system may reach out and communicate with those networks across the enterprise backbone. The poller process 201 may initiate the discovery of the fiber-optic network 206 at the predetermined interval. The poller process 201 may provide a fast mechanism to determine whether changes have occurred in a particular region (e.g., any of regions 209, 211, 213, and 215) to rediscover the network. In case no changes have occurred in that particular region, the poller process 201 may continue the discovery of the rest of the regions without traversing through the details of each of the nodes in case nothing changed. The poller process 201 may utilize a hashing generation 203 as an efficient mechanism that generates and assign a singular hash value that correlates various aspects of a component of the network (e.g., a ring, a node, a link, etc.) into the hash value.

The hashing generation 203 may be a process that utilizes a hashing algorithm/mechanism to generate a hash value associated with the various components of the fiber-optic network 206. Some examples of hashing algorithms/mechanisms that may be used include secure hash algorithm 1 (SHA-1), message-digest 5 (MD5) hashing algorithm, or other algorithms. SHA-1 is a cryptographic hash function which takes an input and produces a 160-bit (20-byte) hash value known as a message digest typically rendered as a hexadecimal number, 40 characters long. An MD5 algorithm is a widely used hash function producing a 128-bit hash value.

The hashing comparison 205 may be a process that compares a generated hash value associated with a component of the fiber-optic network 206 using the hash generation 203 and a stored hash value in the topology database 204. That is, a generated hash value may be compared using the hash comparison 205 to corresponding data retrieved from the topology database 204. The topology database 204 comprises various hash values associated with various components of the fiber-optic network 206. Without the poller process 201, determining whether something has changed in a network may take a long time to process. For example, if a Southeast region has not experienced any changes, currently, in order to analyze that region, a discovery process traverses through all the components of that Southeast region even though nothing has changed. that discovery process starts by accessing a device and determining what is directly connected to that device. The discovery process continues to branch out to additional devices to discover the topology. This process may take a long time because of the traversing from device to device even if nothing has changed in that topology. However, the poller process 201 may quickly determine that no changes have occurred in that Southeast region and therefore the poller process 201 continues to the next region without spending too much time traversing through various components of a topology.

In one or more embodiments, the hash generation 203 may utilize a hashing mechanism (e.g., SHA-1 algorithm, MD5 algorithm, or any other hashing mechanism) to generate the respective hash values associated with the various components of the fiber-optic network 206. The generated hash values may then be used to compare to respective hash values in the topology database 204 using the hash comparison 205. When a hash value does not match a prior hash value in the topology database 204 from a prior run of the poller process, the poller process 201 may perform a database update using database update 207. The database update 207 may flag that there has been a change between the hash value that has been generated by the hash generation 203 and the hash value stored in the topology database 204. Further, the database update 207 may update the topology database 204 with the new hash value that has been generated by the hash generation 203.

In one or more embodiments, an efficient network topology diagnostic system may facilitate the use of a topology database 204 that may be accessed by the poller process 201. The topology database 204 may comprise hash values associated with a plurality of nodes in a plurality of rings of the plurality of regions of the fiber-optic network 206. The information in the topology database 204 may be associated with working and non-working components of a fiber-optic network 206. When the poller process 201 is not running, the topology database 204 may be a snapshot of what the result of that poller process 201 prior run was. That is, the topology database 204 may comprise hash values at a particular timestamp. This topology database 204 does not maintain a long term of historical information. At a minimum, the topology database 204 maintains information associated with the last time something changed in topology.

It is understood that the above descriptions are for purposes of illustration and are not meant to be limiting.

Figure 3:
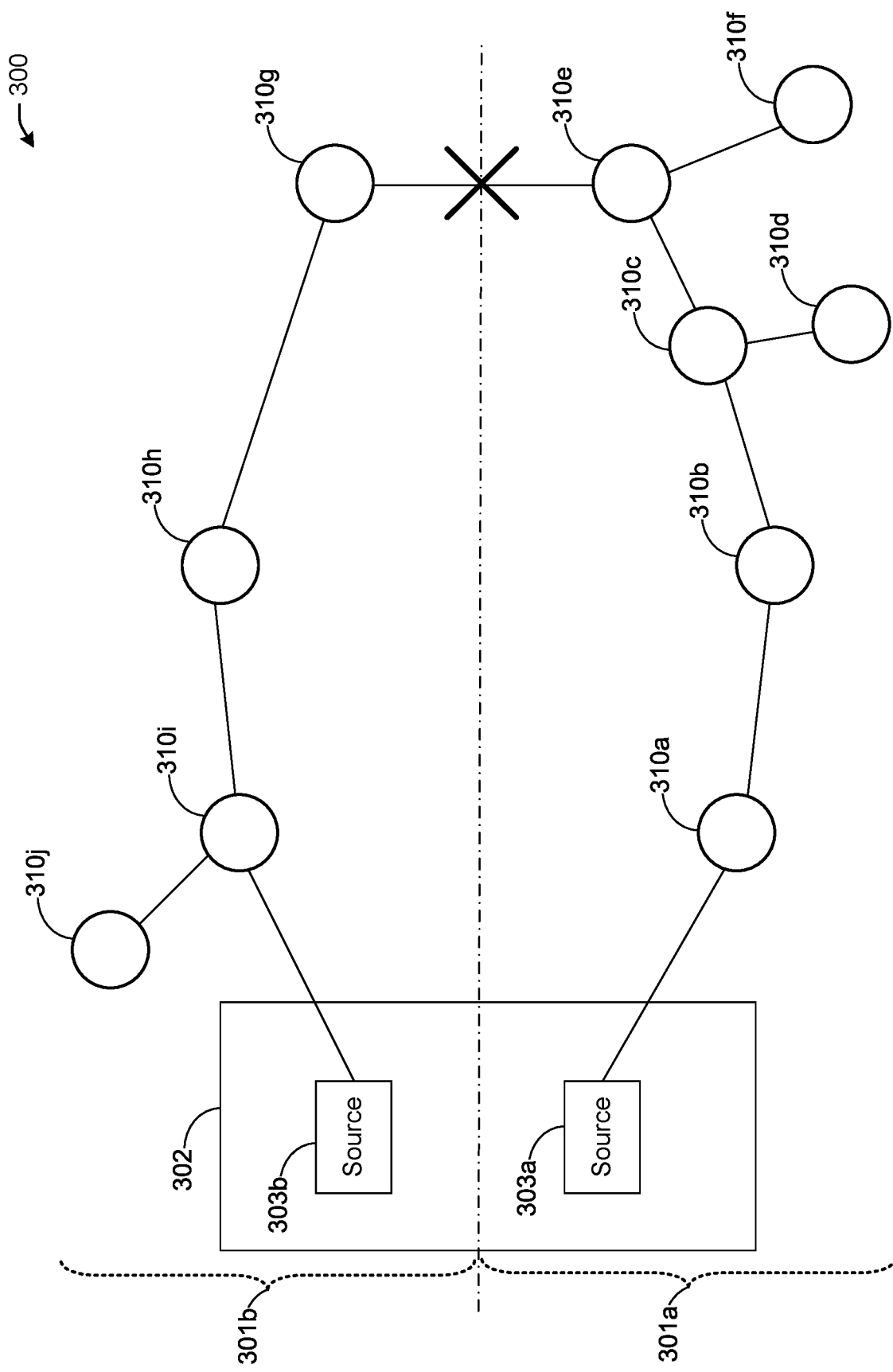
FIG. 3 depicts an illustrative schematic diagram for efficient network topology diagnostic, in accordance with one or more example embodiments of the present disclosure.

FIG. 3 depicts an illustrative schematic diagram for efficient network topology diagnostic, in accordance with one or more example embodiments of the present disclosure.

Referring to FIG. 3, there is shown an example system 300 for providing fiber-optic communication. The system 100 may include a data center 302 comprising two core routers (sources 303a and 303b) and one or more fiber-optic nodes 310 (310a-310j). The one or more fiber-optic nodes 310 may be routers that route the fiber-optic signal from one device to another. The sources 303a and 303b may be configured to output fiber-optic broadband communications for delivery to the fiber-optic nodes 310 in the network. According to an aspect of the disclosure, signals or communications that are output by fiber-optic nodes 310 may be communicated to the sources 303a and 303b using at least one of two separate return paths. The sources 303a and 303b may be suitable sources of fiber-optic broadband content. The sources 303a and 303b may be configured to generate and/or combine any number of data streams and/or data components into a fiber-optic broadband signal for receipt by the one or more fiber-optic nodes 310.

The ring may also comprise devices (e.g., nodes 310d, 310f, and 310j) that are hanging off of it. These devices may belong to the ring but do not form a redundant path back to the data center 302. These types of devices (e.g., nodes 310d, 310f, and 310j) are considered spokes. A spoke may represent a point where a piece of equipment hangs off a ring. It should be appreciated that such configuration is not limited to one device hanging off a ring but there may be many scenarios where they could be a plurality of devices that may be connected to a ring but do not form a ring or do not have a redundant path to the data center as in the case for a ring.

In the example of FIG. 3, the fiber-optic nodes 310 form a ring starting from source 303a that is connected to fiber-optic note 310a connected to fiber-optic node 310b connected to fiber-optic node 310c connected to fiber-optic node 310e connected to fiber-optic node 310g connected to fiber-optic 310h connected to fiber-optic node 310i and finally back to the second source 303b at the data center 302. As shown in FIG. 3, there may be two sections of the ring. Section 301a may be considered as a first half of the ring where the section 301a comprises the source 303a, the fiber-optic node 310a, the fiber-optic node 310b, the fiber-optic node 310c, the fiber-optic node 310e. While the section 301b may be considered a second half of the ring where the section 301b comprises the fiber-optic node 310g, the fiber-optic node 310h, the fiber-optic node 310i, and the source 303b. It should be understood that although the two sections 301a and 301b are shown with the configuration of FIG. 3, the sections may comprise more or fewer nodes based on implementation.

As shown in FIG. 3, each of the fiber-optic node 310 may have a connection back to the data center 302. A fiber-optic note 310 may have two links to and from the two core routers (e.g., sources 303a and 303b). If a customer device is to be added to the fiber-optic ring, a physically/geographically closest fiber-optic node may be located to tie in the customer device to the fiber-optic ring.

In case a link between two fiber-optic nodes 310 is broken, a ring configuration as shown in FIG. 3 may provide a route back to the data center for each of these nodes. For example, in this case, a break in the link between fiber-optic node 310g and the fiber-optic node 310e is shown with an X mark. Although the ring may be impaired such that it is not a whole ring anymore due to the broken link between the fiber-optic node 310g and the fiber-optic node 310e, due to this configuration, the node 310e still has a route back to the data center 302 by going through fiber-optic node 310c, which is connected to fiber-optic node 310b, which is connected to fiber-optic node 310a, and then back to the core router at the source 303a. Similarly, the fiber-optic node 310g still has a route back to the second core router at the source 303b through the connections with the fiber-optic nodes 310h and 310i. It is understood that the above descriptions are for purposes of illustration and are not meant to be limiting.

Figure 4:
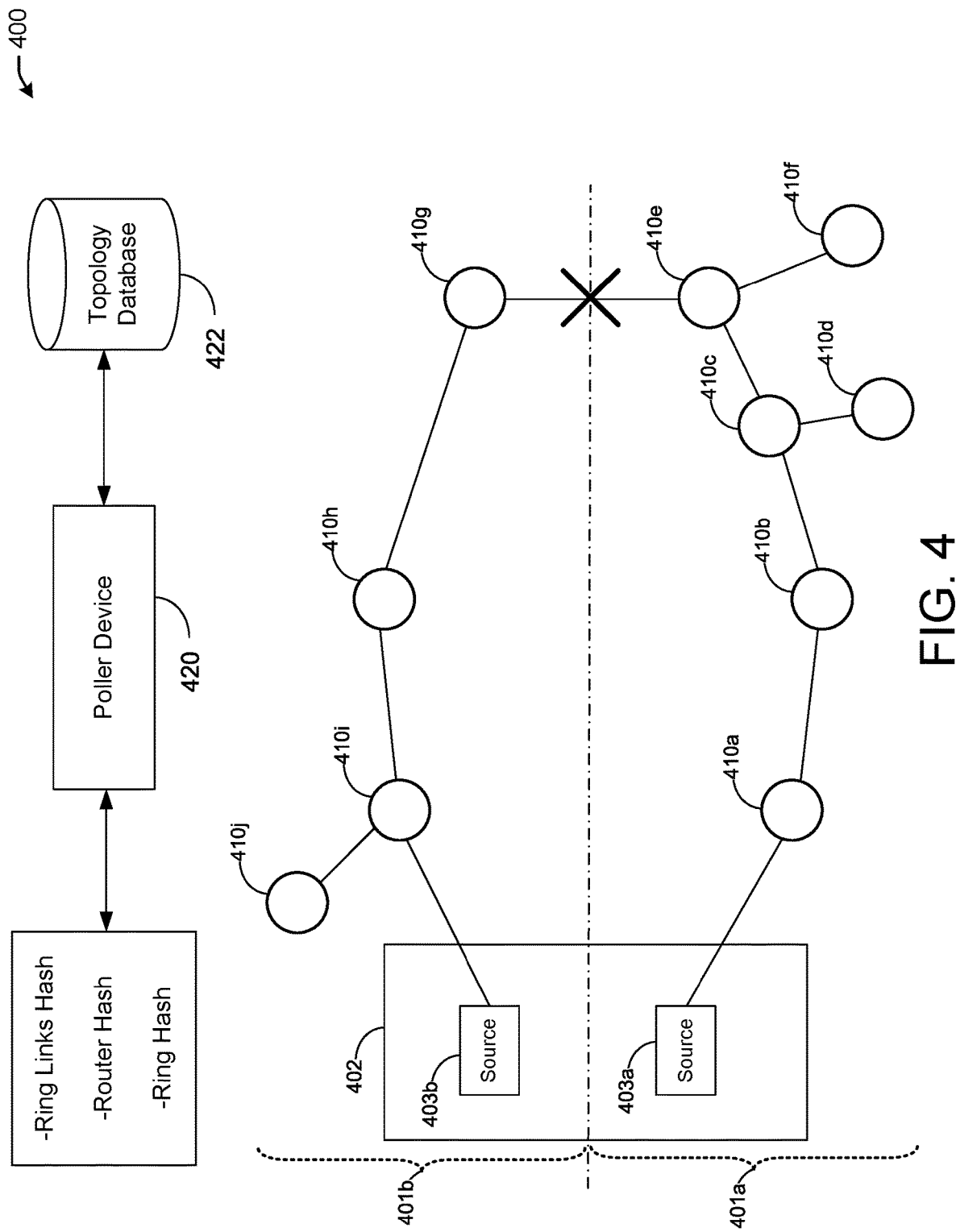
FIG. 4 depicts an illustrative schematic diagram for efficient network topology diagnostic, in accordance with one or more example embodiments of the present disclosure.

FIG. 4 depicts an illustrative schematic diagram for efficient network topology diagnostic, in accordance with one or more example embodiments of the present disclosure.

Referring to FIG. 4, there is shown an illustrative schematic diagram for efficent network topology diagnostic, in accordance with one or more example embodiments of the present disclosure.

In one or more embodiments, an efficient network topology diagnostic system may facilitate the poller device 420 to can discover the ring in FIG. 4 when it is whole or when it is broken into two portions depending on where the impairment occurs on the ring. The poller device 420 may run a poller process at a predetermined interval to scan and discover the various components of the ring shown in FIG. 4. The poller process may assign a hash value to the ring as a whole when it discovers that the ring is intact. On the other hand, the poller process may assign a first hash value to the first portion of the broken ring and a second hash value to the second portion of the broken ring. As the poller process continues to run at the predetermined interval (e.g., 10 minutes) the poller process may rediscover the ring and determine whether it is whole or broken by comparing generated hash values to stored hash values in a topology database of prior runs of the poller process.

In one or more embodiments, an efficient network topology diagnostic system may determine a fault in the ring topology of a fiber-optic network based on building, updating, and comparing various hash values that represent components of the topology. Some examples of hashing algorithms/mechanisms that may be used include secure hash algorithm 1 (SHA-1 algorithm), MD5 hashing algorithm, or other algorithms. SHA-1 is a cryptographic hash function which takes an input and produces a 160-bit (20-byte) hash value known as a message digest typically rendered as a hexadecimal number, 40 characters long. An MD5 algorithm is a widely used hash function producing a 128-bit hash value. The efficient network topology diagnostic system may generate a few hashes to represent the various components of the ring topology of FIG. 4.

For example, the database 422 may store a hash value of the links associated with the ring, which may be referred to as ring links hash. These links may be all the connections in the ring. For example the connection from a first core router at the source 403a in the data center 402 to node 410a, then node 410a to node 410b, then node 410b to 410c, then node 410c to node 410e, then node 410e to node 410g, then node 410g to 410h, then node 410h to node 410i, then node 410i to the second core router at the source 403b in the data center 402.

Another hash may be stored that is reflective of all the routers (e.g., nodes 410) that are in the ring topology of FIG. 4 may be referred to as a router hash. The information that is being hashed may comprise, for example, the name of the router, the firmware, its model, and other router information. This way in case a technician swapped out a router with a different model, the hash value will reflect a change and trigger an update to the database.

Another hash may represent the ring ID as a whole, which may be referred to as ring hash. The core routers at sources 403a and 403b in the data center 402 have starting links out to the field, where those links get a hash value (e.g., SHA-1 hash, MD5 hash, or using any other hashing algorithm). In the example of FIG. 4, the starting links may be the links in portion 401a. For example, a 40 character SHA-1 hash may be assigned to these links and the return links back to the data center may also be assigned a 40 character SHA-1 hash. The return links are shown to be the links in portion 401b. Appending these two strings would result in an 80 character ID representing the two paths forming the ring. This way, when the poller process runs and results in a 40 character ring ID this indicates that the ring is impaired because the 40 character ring ID identifies only a portion of a ring. This may also indicate that this ring ID represents a ring that was never together to begin with or both could have been a spoke. If the poller process returns an 80 character ring ID, this means that there are a start and an end links back to the data center meaning that this is a full ring. In another example, if the poller process returns 120 character ring ID, then there exists a ring with additional connections brought back to the core via another spoke (e.g., nodes 410d, 410f, or 410j) that somehow was hanging off but turned back into a subring attached to the ring. The ring links hash may comprise information about each link between two nodes, the source IP, destination IP, the current status of the routing protocol between those two links, the name of the interface, etc. This way, any changes to that information captured in a ring links hash may indicate a change that will be flagged. Additionally, if anything changes between two nodes, or an interface gets renamed, that also triggers a change in the topology database 422. The router hash comprises the router name, its model number, its loopback IP, etc. For example, if a technician swaps out a box that would cause two hashes to change: the ring links hash and the router hash.

It is understood that the above descriptions are for purposes of illustration and are not meant to be limiting.

Figure 5:
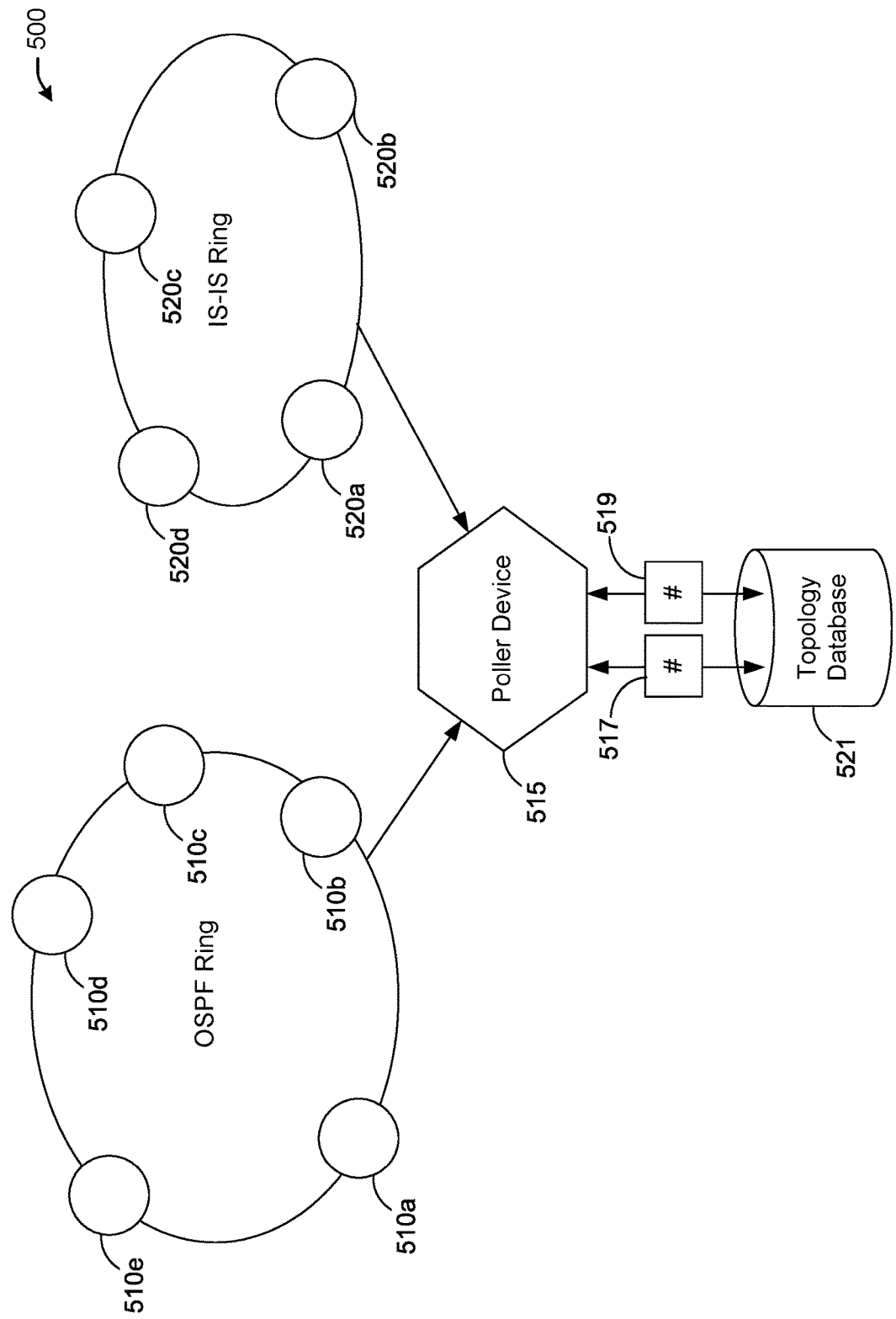
FIG. 5 depicts an illustrative schematic diagram for efficient network topology diagnostic, in accordance with one or more example embodiments of the present disclosure.

FIG. 5 depicts an illustrative schematic diagram for efficient network topology diagnostic, in accordance with one or more example embodiments of the present disclosure.

Referring to FIG. 5, there is shown two first fiber-optic rings that run different routing protocols. For example, a first ring may be an OSPF ring and a second ring may be an IS-IS ring. It should be understood that this is mainly for illustrative purposes and that other rings and with other routing protocols may be envisioned. A poller device 515 may be located in a central location of a fiber-optic network enterprise. The poller device 515 may be in communication with a topology database 512.

In one or more embodiments, an efficient network topology diagnostic system may be independent of the routing protocol when capturing, comparing, and updating a topology database. Each protocol may have its own status indicator. For example, IS-IS might have an in-service or out-of-service indicator but OSPF might have a status of two-way on a link or a transition status. In a fiber-optic network, there may OSPF rings and IS-IS rings. Therefore, when the poller device 515 generates the hash value reflecting information for a particular device, that hash value is independent of the type of ring or protocol running on that device. As long as the statuses of rings, routers, links, stay the same, their hash value does not change indicating that these devices are not experiencing impairments.

The poller device 515 may be connected to the two example rings shown in FIG. 5. The poller device 515 may scan these two rings at a predetermined interval to determine whether a change occurred in any of these rings. The scanning may discover any faults that may have occurred. This discovery of fault may be based on generating and comparing hash values associated with various aspects of the rings. For example, the poller device 515 may collect data associated with the links between nodes of a ring. For example, the OSPF ring of FIG. 5 is shown to have five fiber-optic nodes (nodes 510a-e) that are interconnected to form the OSPF ring. The IS-IS is shown to have four fiber-optic nodes (nodes 520a-d) that are interconnected to form the IS-IS ring.

In one or more embodiments, the poller device 515 may gather various information about the links, the nodes, and the OSPF ring. Similarly, the poller device 515 may gather information associated with the links, notes, and the IS-IS ring. Each of the information may be used to generate a hash. For example, information related to the links may be used to generate a ring links hash, information related to the nodes may be used to generate a router hash, and information related to the ring may be used to generate a ring hash. For example, the poller device 515 may generate a hash value 517 associated with the OSPF ring and a hash value 519 associated with the IS-IS ring. Since a ring may comprise two paths to a data center, the hash value 517 may be comprised of two 40 character hash values, each representing a portion of the ring. The same is true for hash value 519.

In one or more embodiments, there may be many scenarios that result in an update to the topology database 521. For example, after the poller device 515 completes its scan of the rings, a ring may have started as a simplex ring, which the efficient network topology diagnostic system does not know if it is supposed to be a ring. The efficient network topology diagnostic system may determine the existence of two devices that have incomplete ends on them. Hence, the poller device 515 may generate two 40 character ring IDs in the database 521. In case this was a full ring but for some reason, it was changed to simplex due to an impairment and if that impairment is later fixed, the poller device 515 may scan and find an 80 character ring ID after the impairment is fixed. The efficient network topology diagnostic system may perform a check in the database on two halves of the 80 character ring ID (e.g., two 40 character ring IDs representing two portions of a ring) to determine if any of these halves exist in the database. The efficient network topology diagnostic system may break the full 80 character ring ID into a first 40 character ring ID and a second 40 character ring ID. If one of these 40 character ring IDs is present in the topology database 521, this indicates that a ring was impaired because it was shown as half of the newly discovered 80 character ring ID. The efficient network topology diagnostic system may further search for the second 40 character ring ID in the topology database 521. If the second 40 character ring ID is found in the topology database 521, this indicates that there were two partial rings. The efficient network topology diagnostic system may remove anything associated with those partial rings, remove their links, ring entries, and devices, and then write in everything from the newly discovered complete ring. Therefore, this becomes a new ring at that point. But in the opposite case, if the database started with a full ring, and now that ring is under impairment, the scan would result in only a portion of the 80 character ring ID (e.g., 40 character ring ID). The efficient network topology diagnostic system may then flag that the originally captured ring is now impaired. Further, the efficient network topology diagnostic system may determine based on a comparison of the newly discovered complete ring 80 character ring ID with the database that one or more devices may be in an offline state. It is understood that the above descriptions are for purposes of illustration and are not meant to be limiting.

Figure 6:
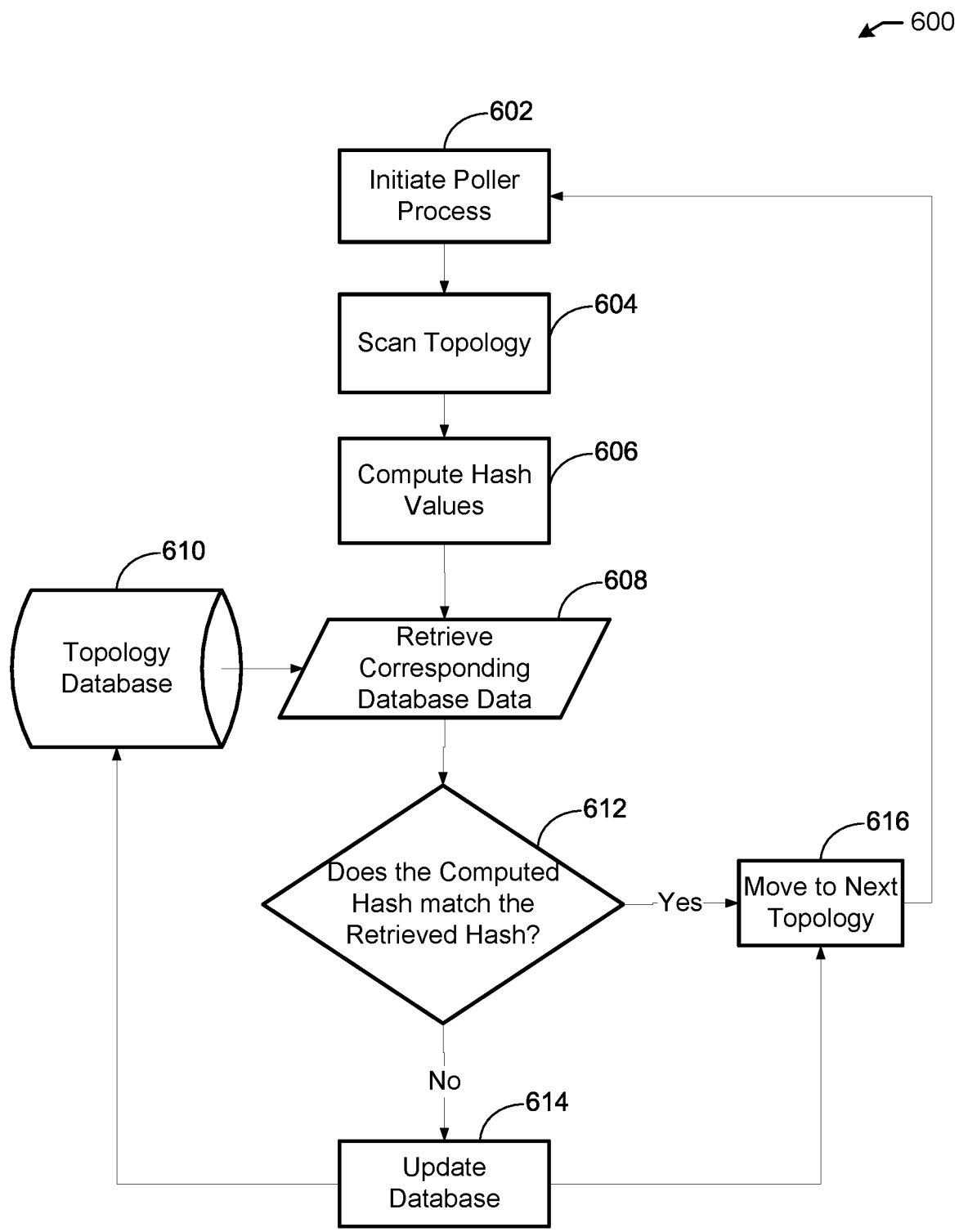
FIG. 6 depicts an illustrative flowchart diagram for efficient network topology diagnostic, in accordance with one or more example embodiments of the present disclosure.

FIG. 6 depicts an illustrative flow diagram for efficient network topology diagnostic, in accordance with one or more example embodiments of the present disclosure.

At block 602, a device may initiate a poller process which may be initiated at a predetermined interval in order to discover a fiber-optic topology at that predetermined interval.

At block 604, the device may scan the fiber-optic topology to determine various aspects and collect information related to components of the fiber-optic topology.

At block 606, the device may utilize a hashing algorithm/mechanism to generate a hash value associated with the various components of the fiber-optic topology. Some examples of hashing algorithms/mechanisms that may be used include secure hash algorithm 1 (SHA-1 algorithm), MD5 hashing algorithm, or other algorithms. For example, information related to the links may be used to generate a ring links hash, information related to the nodes may be used to generate a router hash, and information related to the ring may be used to generate a ring hash.

At block 608, the device may access a topology database 610 in order to retrieve corresponding database data that can be used to compare the computed hash value to the existing hash value for a component of the fiber-optic topology. For example, looking at a ring links hash that was computed at block 606, the device may retrieve from the topology database 608 a corresponding hash value that was computed at a prior run of the poller process when a change was discovered.

At block 612, the device may perform a comparison of the retrieved hash value and the computed hash value. The device may determine whether these values match or if they are different. In case the comparison returns a match of the computed hash value to the retrieved hash value, the device may move to the next topology at block 616 and restart the process at block 602.

At block 614, in case the comparison returns a mismatch of the computed hash value to the retrieved hash value, the device may update the topology database 610 with the new hash value. After updating the topology database 610, the device may move to the next topology at block 616 and then restart the process at block 602.

It is understood that the above descriptions are for purposes of illustration and are not meant to be limiting.

Figure 7:
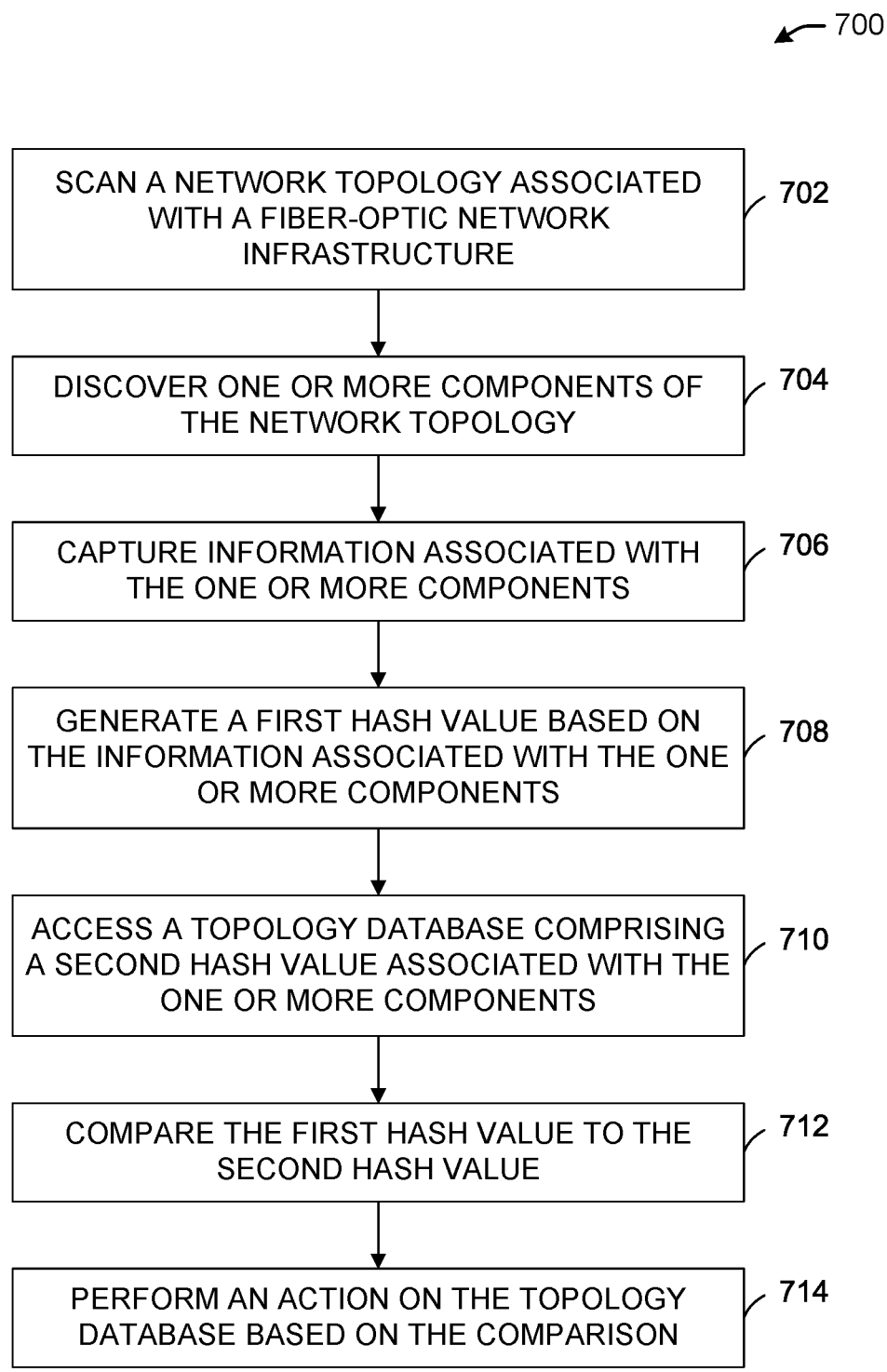
FIG. 7 illustrates a flow diagram of illustrative process for an illustrative efficient network topology diagnostic system, in accordance with one or more example embodiments of the present disclosure.
Figure 8:
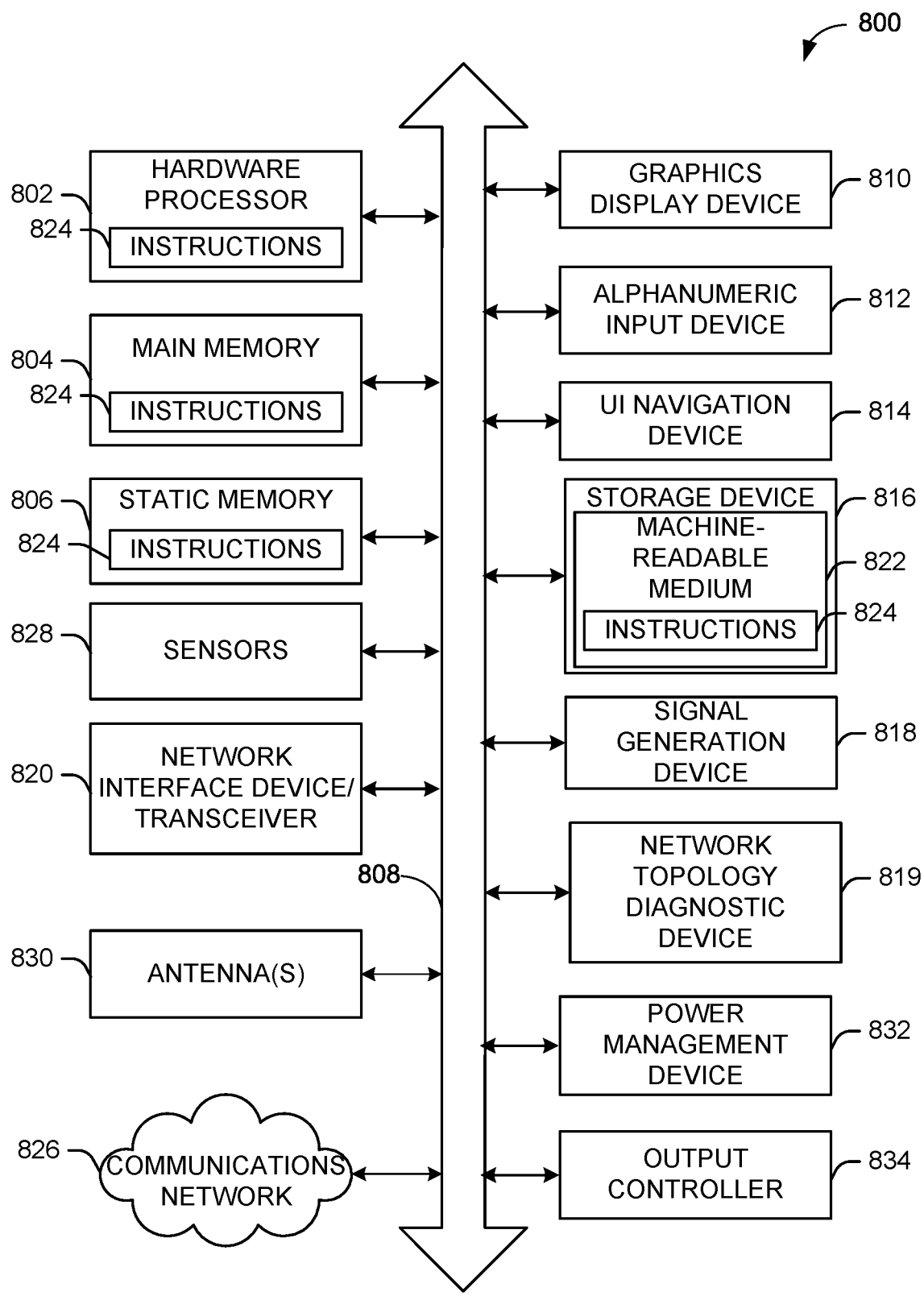
FIG. 8 illustrates a block diagram of an example machine upon which any of one or more techniques (e.g., methods) may be performed, in accordance with one or more example embodiments of the present disclosure.

FIG. 7 illustrates a flow diagram of illustrative process 700 for an efficient network topology diagnostic system, in accordance with one or more example embodiments of the present disclosure.

At block 702, the device may scan a network topology associated with a fiber-optic network infrastructure.

At block 704, the device may discover one or more components of the network topology. The one or more components comprise a ring, a set of communication links, a set of routers. The one or more components connect to two or more core routers at a data center associated with the fiber-optic network infrastructure.

At block 706, the device may capture information associated with the one or more components.

At block 708, the device may generate a first hash value based on the information associated with the one or more components. The first hash value and the second hash value are generated using a hashing algorithm. The hashing algorithm may comprise a secure hash algorithm 1 (SHA-1) or a message-digest 5 (MD5) hashing algorithm. The first hash value is an 80 character string representing a complete ring, wherein a first 40 character string of the 80 character string representing a first portion of the complete ring and a second 40 character string of the 80 character string representing a second portion of the complete string. The first hash value is a 40 character string representing a partial ring.

At block 710, the device may access a topology database comprising a second hash value associated with the one or more components.

At block 712, the device may compare the first hash value to the second hash value.

At block 714, the device may perform an action on the topology database based on the comparison. The action may comprise the processing circuitry being further configured to: determine the first hash value is different from the second hash value and replace the second hash value in the topology database with the first hash value. The action may comprise the processing circuitry being further configured to: determine the first hash value is the same as the second hash value and transition to a second network topology to discover components of the second network topology.

It is understood that the above descriptions are for purposes of illustration and are not meant to be limiting.

FIG. 11 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device 816, a signal generation device 818 (e.g., a speaker), an efficient network topology diagnostic device 819, a network interface device/transceiver 820, antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The efficient network topology diagnostic device 819 may carry out or perform any of the operations and processes (e.g., processes 600 and 700) described and shown above.

It is understood that the above are only a subset of what the efficient network topology diagnostic device 819 may be configured to perform and that other functions included throughout this disclosure may also be performed by the efficient network topology diagnostic device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method. The method also includes scanning, by one or more processors, a network topology associated with a fiber-optic network infrastructure. The method also includes discovering one or more components of the network topology. The method also includes capturing information associated with the one or more components. The method also includes generating a first hash value based on the information associated with the one or more components. The method also includes accessing a topology database including a second hash value associated with the one or more components. The method also includes comparing the first hash value to the second hash value. The method also includes performing an action on the topology database based on the comparison. Other embodiments of this aspect include corresponding computer systems, apparatus, and computer programs recorded on one or more computer storage devices, each configured to perform the actions of the methods.

Implementations may include one or more of the following features. The method where the one or more components include a ring, a set of communication links, a set of routers. The one or more components connect to two or more core routers at a data center associated with the fiber-optic network infrastructure. The action includes the processing circuitry being further configured to: determining the first hash value is different from the second hash value; and replacing the second hash value in the topology database with the first hash value. The action includes the processing circuitry being further configured to: determining the first hash value is the same as the second hash value; and transitioning to a second network topology to discover components of the second network topology. The first hash value and the second hash value are generated using a hashing algorithm. The hashing algorithm includes a secure hash algorithm 1 (SHA-1) or a message-digest 5 (MD5) hashing algorithm. The first hash value is an 80 character string representing a complete ring, where a first 40 character string of the 80 character string representing a first portion of the complete ring and a second 40 character string of the 80 character string representing a second portion of the complete string. The first hash value is a 40 character string representing a partial ring. Implementations of the described techniques may include hardware, a method or process, or computer software on a computer-accessible medium.

One general aspect includes a device. The device also includes scan a network topology associated with a fiber-optic network infrastructure. The device also includes discover one or more components of the network topology. The device also includes capture information associated with the one or more components. The device also includes generate a first hash value based on the information associated with the one or more components. The device also includes access a topology database including a second hash value associated with the one or more components. The device also includes compare the first hash value to the second hash value. The device also includes perform an action on the topology database based on the comparison. Other embodiments of this aspect include corresponding computer systems, apparatus, and computer programs recorded on one or more computer storage devices, each configured to perform the actions of the methods.

Implementations may include one or more of the following features. The device where the one or more components include a ring, a set of communication links, a set of routers. The one or more components connect to two or more core routers at a data center associated with the fiber-optic network infrastructure. The action includes the processing circuitry being further configured to: determine the first hash value is different from the second hash value; and replace the second hash value in the topology database with the first hash value. The action includes the processing circuitry being further configured to: determine the first hash value is the same as the second hash value; and transition to a second network topology to discover components of the second network topology. The first hash value and the second hash value are generated using a hashing algorithm. The hashing algorithm includes a secure hash algorithm 1 (SHA-1) or a message-digest 5 (MD5) hashing algorithm. The first hash value is an 80 character string representing a complete ring, where a first 40 character string of the 80 character string representing a first portion of the complete ring and a second 40 character string of the 80 character string representing a second portion of the complete string. The first hash value is a 40 character string representing a partial ring. Implementations of the described techniques may include hardware, a method or process, or computer software on a computer-accessible medium.

One general aspect includes a non-transitory computer-readable medium storing computer-executable instructions which when executed by one or more processors result in performing operations. The non-transitory computer-readable medium storing computer-executable instructions also includes scanning a network topology associated with a fiber-optic network infrastructure. The non-transitory computer-readable medium storing computer-executable instructions also includes discovering one or more components of the network topology. The non-transitory computer-readable medium storing computer-executable instructions also includes capturing information associated with the one or more components. The non-transitory computer-readable medium storing computer-executable instructions also includes generating a first hash value based on the information associated with the one or more components. The non-transitory computer-readable medium storing computer-executable instructions also includes accessing a topology database including a second hash value associated with the one or more components. The non-transitory computer-readable medium storing computer-executable instructions also includes comparing the first hash value to the second hash value. The non-transitory computer-readable medium storing computer-executable instructions also includes performing an action on the topology database based on the comparison. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the one or more components include a ring, a set of communication links, a set of routers. Implementations of the described techniques may include hardware, a method or process, or computer software on a computer-accessible medium.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., multiprotocol label switching (MPLS), frame relay, internet protocol (IP), transmission control protocol (TCP), user datagram protocol (UDP), hypertext transfer protocol (HTTP), etc.).

The network interface(s) 820 may contain the mechanical, electrical, and signaling circuitry for communicating data over links coupled to the network. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a network interface 820 may also be used to implement one or more virtual network interfaces, such as for virtual private network (VPN) access, known to those skilled in the art.

Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Fiber-optic, Ethernet, coaxial, or phone jacks) or one or more antennas to connect to the communications network 826.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication systems (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The invention claimed is:

1. A method comprising:
   scanning, by one or more processors, a network topology associated with a fiber-optic network infrastructure;
   discovering one or more components of the network topology;
   capturing information associated with the one or more components;
   generating a first hash value based on the information associated with the one or more components;
   accessing a topology database comprising a second hash value associated with the one or more components;
   comparing the first hash value to the second hash value; and
   performing an action on the topology database based on the comparison, wherein the action comprises replacing the second hash value in the topology database with the first hash value or transitioning to a second network topology to discover components of the second network topology.

2. The method of claim 1, wherein the one or more components comprise a ring, a set of communication links, and a set of routers.

3. The method of claim 1, wherein the one or more components connect to two or more core routers at a data center associated with the fiber-optic network infrastructure.

4. The method of claim 1, wherein the action comprises the one or more processors being further configured to:
   determining the first hash value is different from the second hash value; and
   replacing the second hash value in the topology database with the first hash value based on the determination that the first hash value is different from the second hash value.

5. The method of claim 1, wherein the action comprises the one or more processors being further configured to:
   determining the first hash value is the same as the second hash value; and
   transitioning to the second network topology to discover the components of the second network topology based on the determination that the first hash value is the same as the second hash value.

6. The method of claim 1, wherein the first hash value and the second hash value are generated using a hashing algorithm.

7. The method of claim 6, wherein the hashing algorithm comprises a secure hash algorithm 1 (SHA-1) or a message-digest 5 (MD5) hashing algorithm.

8. The method of claim 1, wherein the first hash value is an 80 character string representing a complete ring, wherein a first 40 character string of the 80 character string representing a first portion of the complete ring and a second 40 character string of the 80 character string representing a second portion of the complete string.

9. The method of claim 1, wherein the first hash value is a 40 character string representing a partial ring.

10. A device, the device comprising processing circuitry coupled to storage, the processing circuitry configured to:
    scan a network topology associated with a fiber-optic network infrastructure;
    discover one or more components of the network topology;
    capture information associated with the one or more components;
    generate a first hash value based on the information associated with the one or more components;

access a topology database comprising a second hash value associated with the one or more components;
compare the first hash value to the second hash value; and
perform an action on the topology database based on the comparison, wherein the action comprises at least one of replacing the second hash value in the topology database with the first hash value or transitioning to a second network topology to discover components of the second network topology.

11. The device of claim 10, wherein the one or more components comprise a ring, a set of communication links, and a set of routers.

12. The device of claim 10, wherein the one or more components connect to two or more core routers at a data center associated with the fiber-optic network infrastructure.

13. The device of claim 10, wherein the action comprises the processing circuitry being further configured to:
determine the first hash value is different from the second hash value; and
replace the second hash value in the topology database with the first hash value based on the determination that the first hash value is different from the second hash value.

14. The device of claim 10, wherein the action comprises the processing circuitry being further configured to:
determine the first hash value is the same as the second hash value; and
transition to the second network topology to discover the components of the second network topology based on the determination that the first hash value is the same as the second hash value.

15. The device of claim 10, wherein the first hash value and the second hash value are generated using a hashing algorithm.

16. The device of claim 15, wherein the hashing algorithm comprises a secure hash algorithm 1 (SHA-1) or a message-digest 5 (MD5) hashing algorithm.

17. The device of claim 10, wherein the first hash value is an 80 character string representing a complete ring, wherein a first 40 character string of the 80 character string representing a first portion of the complete ring and a second 40 character string of the 80 character string representing a second portion of the complete string.

18. The device of claim 10, wherein the first hash value is a 40 character string representing a partial ring.

19. A non-transitory computer-readable medium storing computer-executable instructions which when executed by one or more processors result in performing operations comprising:
scanning a network topology associated with a fiber-optic network infrastructure;
discovering one or more components of the network topology;
capturing information associated with the one or more components;
generating a first hash value based on the information associated with the one or more components;
accessing a topology database comprising a second hash value associated with the one or more components;
comparing the first hash value to the second hash value; and
performing an action on the topology database based on the comparison, wherein the action comprises at least one of replacing the second hash value in the topology database with the first hash value or transitioning to a second network topology to discover components of the second network topology.

20. The non-transitory computer-readable medium of claim 19, wherein the one or more components comprise a ring, a set of communication links, and a set of routers.

* * * * *